United States Patent [19]

Lockridge

[11] 3,828,696
[45] Aug. 13, 1974

[54] SAFETY KNEEBOARD
[76] Inventor: James E. Lockridge, Kailua, Hawaii
[22] Filed: Mar. 20, 1972
[21] Appl. No.: 236,062

[52] U.S. Cl. ............................................. 108/43
[51] Int. Cl. ..................... A47b 23/00, A47b 37/00
[58] Field of Search ............................ 108/40–49; 297/220; 24/204, 674, 255, 137 R; 248/309–314; 240/59; 35/61, 66

[56] References Cited
UNITED STATES PATENTS

| | | | |
|---|---|---|---|
| 57,263 | 8/1866 | Winter | 24/137 R |
| 696,044 | 3/1902 | Hoffmann | 108/43 |
| 753,457 | 3/1904 | Weissbrod | 24/3 A |
| 956,534 | 5/1910 | Lahey | 108/43 |
| 1,274,312 | 7/1918 | Nicoll | 24/3 A |
| 1,351,935 | 9/1920 | Willis | 35/62 |
| 1,407,239 | 2/1922 | Weiss | 108/43 |
| 1,930,478 | 10/1933 | Jones | 108/43 X |
| 2,099,295 | 11/1937 | Canfield | 108/43 |
| 2,284,501 | 5/1942 | Welch | 108/43 |
| 2,319,316 | 5/1943 | Gerendas | 24/255 BC |
| 2,420,673 | 5/1947 | Monrad | 108/43 UX |
| 2,701,173 | 2/1955 | Senior et al. | 108/43 |
| 2,776,848 | 1/1957 | Sturell | 108/43 X |
| 2,791,040 | 5/1957 | Santorelli | 108/43 X |
| 2,876,022 | 3/1959 | Kroviak | 108/43 |
| 2,881,009 | 4/1959 | Delaney | 108/43 |
| 2,990,308 | 6/1961 | Goldstein | 35/66 |
| 3,005,091 | 10/1961 | Cote | 24/81 CL |
| 3,215,453 | 11/1965 | Malcom, Jr. | 108/43 X |
| 3,321,068 | 5/1967 | Beach | 24/204 E UX |
| 3,361,091 | 1/1968 | Inman | 108/43 |
| 3,374,508 | 3/1968 | Slimovitz | 24/204 UX |
| 3,407,757 | 10/1968 | Warner | 108/43 |
| 3,432,944 | 3/1969 | Ishida | 35/66 |
| 3,458,110 | 7/1969 | Goldman | 24/255 BC |
| 3,639,952 | 2/1972 | Thompson | 24/255 BC |

FOREIGN PATENTS OR APPLICATIONS

| | | | |
|---|---|---|---|
| 875,442 | 9/1942 | France | 24/255 |
| 20,741 | 7/1914 | Great Britain | 108/43 |

Primary Examiner—Paul R. Gilliam
Assistant Examiner—G. O. Finch

[57] ABSTRACT

This invention relates to a flexible flat safety kneeboard for use in ejection seat aircraft to prevent injury to the wearer and physically, jaming the aircraft controls. The surface may be a write-on/erasable type. A phosphorescent layer may be used between the structural surface and a write-on/erasable surface whereupon writing may be effected with a common pencil and may be read in otherwise total darkness. Non-metallic plastic slide lock clamps may be used to hold flight forms or note paper. Velcro, may be used to receive and hold a pencil, or miniature flashlight. A lanyard attaching means may be attached to the kneeboard piano.

7 Claims, 10 Drawing Figures

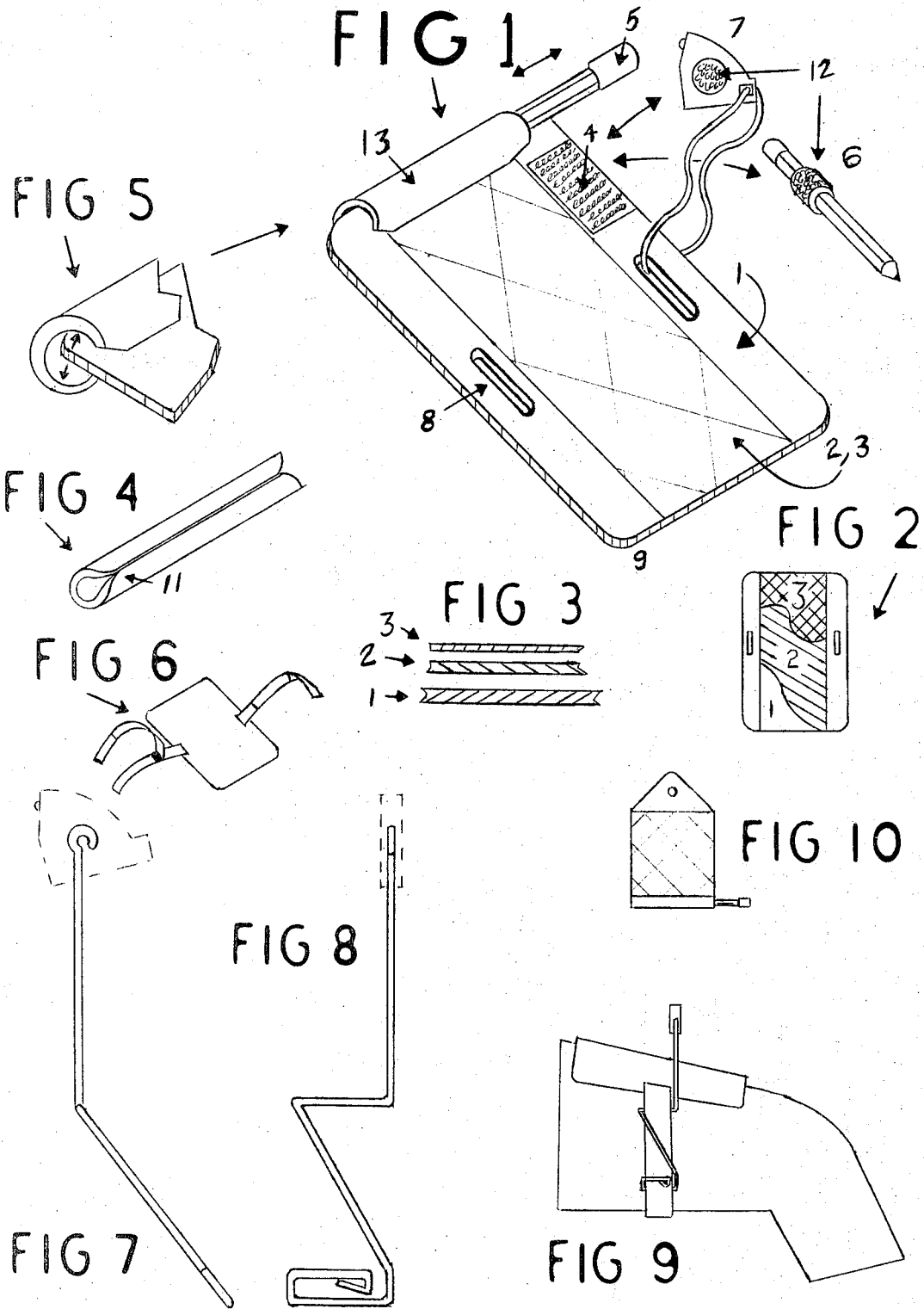

SAFETY KNEEBOARD

The invention is applicable to underwater use, in a slightly modified shape.

SUMMARY OF THE INVENTION

The leg mounted clipboard device (kneeboard) normally used by aircrew members, especially military pilots, has many disadvantages. It is bulky, sometimes interferes with aircraft control movements even when properly worn, has caused multi-million dollar airplanes to crash by being accidentally dropped in the cockpit and jamming flight controls, and is inconvenient to carry around on the ground. In the case of the military aviator who flies ejection seat equipped high speed aircraft it is an additional hazard in the event of bailout due to its rigidity, bulk, and sharp edges and has in the past inflicted injury to the aircrew member in such instances.

This invention is a light weight, flexible safety kneeboard for use primarily, though not exclusively, by pilots of ejection seat equipped aircraft and in conjunction with a Mapstrap, or other appropriate strap device, the preferred leg attaching strap device being essentially a point aside from the disclosure herein having been previously patented in U.S. Pat. No. 3,543,977, and otherwise not an object of claim.

This safety kneeboard is preferably constructed of 0.090 inches low density polyethylene plastic, being stamped out of sheet stock and having overall dimensions of approximately 5 inches × 8 inches, although the source material could as easily be leather, rubber, or composition material and likewise the low density polyethylene or other flexible plastic could easily be formed, with additional pertubations and appurtances as specialized design dictated, by injection molding or other methods common to the industry, however the process and material described herein are considered the most advantageous considering production costs and the utility of the finished product. The essential characteristics of this kneeboard are light weight, flexibility, and lack of bulk and sharp corners so that the unit will be unlikely to cause injury to the pilot in the event of an emergency ejection, yet provide adequate firmness for writing support in normal use. The same characteristics also significantly decrease the probability that a kneeboard herein described would be likely to physically jam flight controls or other mechanisms accessable in the cockpit in the event the kneeboard were to be accidentally dropped or misplaced in the cockpit during flight. A point of major convenience is that this kneeboard in preferred embodiment, being essentially flat, flexible, and light in weight, fits easily into the pocket of a flight suit, trousers, or jacket when not in use — a practical impossibility with former kneeboards. The plastic described herein and utilized for prototest models is readily available from industrial plastic supply houses throughout the United States in 4 by 8 foot sheets, and the dies are available from tool and die fabricators located in any major city. A Clikker Die machine such as is common to the shoe industry was used for cutting prototest units.

An additional characteristic of a preferred embodiment of the safety kneeboard is the addition of a permanent or semi-permanent write-on/erasable surface whereupon writing may be effected with a common pencil and later erase with a conventional rubber eraser. A desirable color for the structural plastic, or other material, of the kneeboard is white thereby providing contrast and easy readability of the writing thereupon. Various types of write-on/erasable material are available, generally in the form of acetate tape. The type used by the inventor is known commercially as Scotch Magic Transparent Tape, Type 810, and 3M Company's Type 7,700, available from 3 M Company in St. Paul, Minnesota, in specified widths.

This tape was applied to the surface of the flexible plastic board by hand, using a rubber roller to enhance smoothness, and the excess was trimmed with a razor knife. The adhesive of the tape is adequate to provide a lasting bond, although not so absolutely permanent as to prevent later intentional peeling the tape from the board and replacing it with new tape if the surface should, after extensive use, become unduly smudged or worn. The use of the white board with transparent or transluscent tape should not be considered as limiting, as most colors provide some degree of contrast for reading the writing upon the transparent overlays and any color board would be similarly usable with an overlay that was not transparent but white such as 3 M Company's type 7,600 white tape which may in turn be overlayed by a write-on/erasable tape.

An optional characteristic of the subject kneeboard would be the inclusion of a phosphorescent material under the writing surface so that the writing surface is adequately illuminated to provide contrast against the writing in otherwise total darkness. Various assembly techniques include having the phosphorescent material included in the raw plastic mixture prior to extrusion or molding, covering the surface with phosphorescent paint, or overlaying the structural surface of the board with a phosphorescent tape such as a vinyl phosphorescent tape produced by Canrad Precision Industries, of New York. Prototest models were constructed using the Canrad tape. The vinyl phosphorescent tape provides visible, non-radioactive and non-electrically stimulated illumination for a period of 8 hours after exposure to natural or artificial lighting.

The illumination is greatest immediately after exposure to the lighting and decreases rapidly at first, then gradually, but at the same approximate rate that the human eye becomes dark adapted so that illumination, after the initial decrease, appears constant to the eye. The tape is light yellow in color and emits a green phosphorescent light of approximately 5,600 angstroms immediately after exposure. Recharging exposure time is only three to ten seconds under natural or artificial light, or as little as 1/1000 seconds by photo-strobe light. This vinyl phosphorescent tape is in turn overlayed by 3 M Company's 810 or 7,700 write-on/erasable tape.

An additional characteristic of this kneeboard is the utilization of non-metallic (generally plastic) slide lock clamps to hold flight forms or note paper to the kneeboard. In the past kneeboards have typically utilized either built in or detachable spring operated metal clamps. Such clamps have several disadvantages including bulk, sharp edges, and the necessity to significantly raise the surface profile of the unit in order to provide working room and leverage for the spring operated clamping mechanism and handle. This new safety kneeboard avoids those inconveniences entirely by utilizing an extremely simple tubular slide lock clamp device produced to the inventors specifications by Imagineers, Inc. of Orange, California. A somewhat longer clamp, otherwise identical, is marketed by Imagineers as a "Bag Closer" in super markets. A significant additional advantage of this tubular clamp, in 9/16 inches diameter, is that it functions perfectly as a pencil holder by simply inserting the pencil into the end of the tube when the tube is mounted on the kneeboard. The tube clamp is longitudinally flexible also, which additionally decreases danger of aircrew injury, of flight control involvement.

Another type of plastic clamp which can be used, though lacking the pencil holding capability, is the wedge shaped cross section "Slide Hinge" produced by Westab, of Dayton, Ohio or the "Slide Lock" produced by Kingsbacher-Murphy Co. of Los Angeles, California both of which are sold in 11 inches lengths for the purpose of assembling report covers, term papers, etc. The clamps are cut to desired length (3.75 inches) for kneeboard use.

These plastic clamps all obtain their clamping ability from the natural tension of the molded plastic and require no other mechanism, such as springs, to function. The pencil holding function of the preferred tubular clamp is a result of the spring action of the edge of the basic kneeboard that is inserted through the lengthwise slot in the tube. The natural flexiblity of the plastic, fulcrumed at the slot lip, provides a springy tongue which applies an appropriate holding pressure to the pencil as it is inserted into the end of the tube, the pencil being then held by the pressure of the tongue on one side and the inside wall of the clamp on the other side.

The preferable embodiment of the safety kneeboard herein disclosed uses one such plastic tubular clamp at the top and optionally, one at the bottom, although such utilization should be considered as illustrative and not limiting as various requirements might preferably use similar devices on the sides and in various configurations.

An additional characteristic of the safety kneeboard is the application of a portion or strip of Velcro, or similar, contact type fastener material to the surface of the kneeboard the purpose of which is to receive and hold a pencil, or other writing instrument, to which is attached the mating type fastener material (an example being the plastic and Velcro pencil encircling clip disclosed in American Velcro's U.S. Pat. No. 3,387,341). The kneeboard mounted Velcro strip could also receive a small flashlight which likewise had the opposite type of fastener material attached to it, for the purpose of holding the flashlight when it was not in use. The pencil and/or the flashlight could be mounted on a short lanyard of approximately 8 inches to facilitate retrival in the event it was dropped in a dark cockpit. The Velcro material referred to above comes in two mating types, the hook and the pile. This fastener is usually constructed of a woven nylon material, although polyvinylchloride extrusion material is also being produced and the function is the same. When the two mating materials are pressed together the two mesh and have a minimum shear force limit of 5 to 6 pounds pull, yet the two materials will easily peel apart with only 0.4 to 0.75 pounds per square inch pressure. Velcro Fastener is available from American Velcro, Inc., of New York, N.Y.

An additional characteristic of the safety kneeboard is a micro-miniature flashlight such as is produced by Flex Electric Products of New York under the trade name "Key Beam" and disclosed in U.S. Pat. No. 3,119,564. This flashlight, of a size approximately half that of an asprin tin and triangular in shape, would be mounted to the board by either a short lanyard (preferably 8 inches, of nylon thread) and/or Velcro or similar fastener material, or to the kneeboard's leg attaching strap with a flexible piano wire strap clip as described below. The "Key Beam" light was designed to be mounted on a house or car key in such a manner as to provide one handed operation of both keyhole illumination and the twisting action of the operation of the key in the lock. In the preferred mounting of the key described above, the light is mounting around a small loop on the end of the flexible piano wire clip instead of the hole of the key.

The purpose of the light, and the system of mounting, is to provide an instantly available source of illumination for the night reading of inflight reference materials being held by the kneeboard, Mapstrap, or combination thereof, such illumination being of an appropriate intensity so as not to interfere with the aircrew's night vision, yet adequately illuminate the reference material being reviewed. Additionally, the wire flex clip mounting would hold the light in a definite and known location so as to facilitate accessibility, yet not restrict unduly the direction of the beam in the event the light were required for emergency illumination of the aircraft instruments, etc. Furthermore, the safety philosophy of the kneeboard is further enhanced by the minuscule dimensions and weight of the light, which would pose minimum hazard in the event of the emergency ejection from the aircraft, or aircraft controls interference in the event of misplacement of the kneeboard device. Other lights of similar dimensions and capability are available from other manufacturers and could also be used.

Furthermore, this invention relates to reverse illuminated (backlighted) write-on/erasable surfaces particularly, but not exclusively, as used in aviation on kneeboards and aircrew members' writing desks (both portable and as mounted to the aircraft) or portions thereof, such as are self illuminated, (which is to say that the surface itself is made to glow) by a chemical phosphorescent and/or electroluminescent light source, the light producing surface being covered with a permanent, semi-permanent, or removable write-on/erasable material, or paper, the transluscence of which allows adequate transmission of light to provide readable visual contrast with the characters thereupon written for reading in otherwise total darkness.

A recurring problem that aircrew members, especially pilots, have with existing cockpit lighting, and specifically aircraft mounted map lights and battery lights built into kneeboards, is that the lighting available is generally capable of much brighter illumination than is needed during dark night flying, and although dimming controls and red lenses are available, it often occurs that the light is initially inadvertantly switched on at a bright setting thereby adversely affecting the pilots night adapted vision. Sometimes several minutes are required for the pilot to regain his previous night vision. This can be a serious occurence in combat, or just prior to a night landing.

Another difficulty with existing lighting is that seldom is a map light or writing light so adjusted that the field of illumination is evenly lit. This is in part due to the point source (bulb) and reflector of the incandescent illumination which disperses, typically, a conical beam which is generally truncated obliquely by the plane of the writing surface, the portions of the writing surface being nearest the bulb receiving more light than the portions of the writing surface furthermost from the bulb. This requires the pilot to bend over for a closer look, and move the writing about to illuminate different portions in turn — in general, fumbling about the cockpit. A particular example of this problem is the lighting of current issue USAF kneeboards which tend to light the top part of the board well, but leave the bottom portion poorly illuminated.

My invention eliminates the problems of uneven lighting of the writing surface, and excessive and extraneous lighting in the cockpit as the writing surface ONLY is illuminated, and the illumination is even throughout and at an appropriate intensity so as not to interfere with the pilots night vision, although adjustable within a desirable range. By the very nature of having the writing backlighted, considerably better contrast and readability is available at a much lower level of illumination.

The construction of a preferable embodiment of a chemically phosphorescent backlighted write-on/erasable surface has been disclosed above, and the construction of an electroluminescent write-on/erasable surface is described below.

The construction of a preferable embodiment of an electroluminescent write-on/erasable surface utilizes electroluminescent panels available from Sylvania Corp., of Salem, Mass. such as are described in detail in their booklet "Panelescent Lighting." These panels are available in plastic, metal, and ceramic construction generally less than 0.050 inches in thickness and prepared by the factory to dimensional specifications. The preferred type for use in the flexible safety kneeboard is the "Panelescent Tape-Lite" which is approximately 0.032 inches thick and bendable to a 3 inch radius. Alternating current is required for operation, preferably in the range of 115 volts/60 Hertz to 600 volts/1,000 Hertz. Brightness increases with both frequency and voltage and, depending on the characteristics of the individual type of lamp, color also varies. Green, yellow, blue, and white are typical colors available. Current requirements are typically 50 to 150 microamps per square inch of area, and illumination is typically 5 to 90 foot lamberts.

As the illuminated write-on/erasable surface alone is the point of claim of this disclosure, discussion of type and availability of power source and theory of operation of electroluminescent panels shall be omitted, such discussion being aside from the requirements of the disclosure, except to say that complete descriptions of variable power supplies, both line powered and battery powered transistor controlled oscillator transformer type, are available in POPULAR ELECTRONICS, May 1971, page 43, and November 1961, page 49, and theory of operation of the electroluminescent panels together with performance curves for various types are included in PANELESCENT LIGHTING by Sylvania Corporation, Salem, Mass.

The electroluminescent panel, of an appropriate size and shape for the desired writing surface, is overlayed by permanent, semi-permanent, or removable transparant or transluscent write-on/erasable surface such as 3 M Company's 810 or 7,700 tape, frosted acetate, or paper. An additional interlayer of transparent or transluscent plastic may be included between the electroluminescent panel and write-on/erasable, or write-on/removable surface, the purpose of which is to further project the electroluminescent panel from possible eventual damage from the pressure of the writing instrument and eraser.

DESCRIPTION OF THE DRAWING

A detailed description of a preferred embodiment of my invention will now be given in conjunction with the drawing in which:

FIG. 1 is a general view of the kneeboard with subparts identified.

FIG. 2 is a schematic of the structural surface of the kneeboard with phosphorescent or electroluminescent overlay and write-on/erasable surface depicted.

FIG. 3 is an exploded elevation view of a section of FIG. 2.

FIG. 4 is a perspective view of the tubular clamp.

FIG. 5 is a perspective view of a section of the kneeboard mounted clamp showing clamp position and pencil holding tensions.

FIG. 6 is a general view of the kneeboard mounted on the Mapstrap.

FIG. 7 is a rear elevation view of a preferred flexible piano wire micro flashlight strap mounting clip.

FIG. 8 is a side elevation view of FIG. 7.

FIG. 9 is a side elevation view of the flexible wire clip depicted in FIG. 7 and FIG. 8, in use on the leg.

FIG. 10 is a plan view of an alternate embodiment of a version of the kneeboard as an underwater write-on/erasable, optionally phosphorescent, tablet.

The kneeboard in FIG. 1 is constructed of a die cut main structural component of white low density polyethylene plastic (1) measuring 5 inches × 8 inches × 0.090 inches, having two 1 inch long 3/16 inches wide slots (8) ⅝ inches in from the edges for the purpose of receiving the Mapstrap (see FIG. 6) and four ½ inch radius rounded corners (9). To the structural component is attached a removable 9/16 inch × 3.75 inch tubular plastic slide clamp (13) for the purpose of holding paper, pencil (5) or reference materials. The pencil (5) is inserted or withdrawn from the clamp (13) as shown in the parallel arrow above the pencil (5). An optional feature is a 2.75 inch × 1 inch section of Velcro, or similar, fastener material (4) the purpose of which is to receive a pencil (6) or micro flashlight (7) to which is attached the complimentary mating type fastener (12). The surface overlay of the kneeboard (2,3) is shown in detail in FIG. 2 where the structural plastic (1) is overlayed with a 3.5 inch × 8 inch section (2) of Canrad chemically phosphorescent vinyl tape, or, if desired, Sylvania "Panelescent Tape Lite" electroluminescent material. The illuminating layer (2) is then overlayed with 3 M Company's type 810 or type 7,700 write-on/erasable tape (3), 3.5 inch × 8 inch. FIG. 3 depicts an exploded elevation view of a cross section of FIG. 2. If the electroluminescent illuminating layer (2) is used rather than a chemically phosphorescent layer, a small electrical power wire may be led from the bottom right corner of the kneeboard to a side wall console power outlet of the aircraft, or a miniature battery operated power supply may be attached to the kneeboard or strap. The 9/16 inch × 3.75 inch plastic tube clamp (FIG. 4) has a tapered V-shaped flared end (11) to its slot so that it will seat and feed easily when attached to the top edge of the basic kneeboard by being pushed on from the side. Once the tube clamp is mounted on the kneeboard (FIG. 5) the natural flexiblity of the basic kneeboard, fulcrumed at the tube clamp's slot, provides a springy tongue that applies holding pressure to the pencil as shown by the arrows.

FIG. 7 depicts a rear elevation view of a 0.045 inch diameter piano wire clip designed to be used as a holder for a micro flashlight, such as Flex Electric's "Key Beam" device. The clip holds the light to the kneeboards leg attaching strap, and may be used on a Mapstrap, or other strap device, along and without the kneeboard if desired. FIG. 8 is a side elevation view of the clip, and FIG. 9 shows a side elevation view of the clip in use, attached to the strap. The clip, with light attached, is held upright and in position by the supporting tension resulting from the interleaving of the clips wire around the elastic tensioned strap and the friction of the strap against the thigh.

What I claim as new and desire to secure by letters patent is:

1. An aviator's writing kneeboard comprising a writing structural portion including a board having a flat face for writing and a flat leg-engaging surface opposite the face for resting on an upper leg of a user, the face and the base of the board having rounded corners, having a generally elongated rectangular shape with long side edges and short top and bottom edges and having parallel slots, one on each side slightly inward from the side edges at points approximately half way between the top and bottom edges and aligned approximately parallel with side edges of the face and the base of the board, a clip means connected to the board for holding papers, an anchor means connected to the writing structural portion of the board, the anchor means comprising a knee strap passing loosely through the slots around the upper leg beneath the board for securing the board to an upper leg of a user yet allowing the board to be easily intentionally detached from the strap, the structural portion board comprising a flat, thin, yieldably deformable and resilient sheet of form stable plastic material which is flexible in both top to bottom direction and side to side direction yet the surface of which is firm enough to provide adequate support for writing thereon, and on materials attached thereto, without bending, whereby the board does not injure a user when ejecting from an aircraft and does not jam aircraft controls when loose in a cockpit.

2. A kneeboard, as claimed in claim 1, comprising a non-metallic slide lock type clamps to hold inflight reference material, note paper, and writing instruments, to said kneeboard.

3. An aviator's writing kneeboard of claim 1 comprising a writing structural portion and an anchor means connected to the writing structural portion, the writing structural portion comprising a flat, thin, yieldably deformable and resilient sheet of form stable plastic material, the writing structural portion further being characterized by a surface of semi-permanent write-on and erasable material.

4. An aviator's writing kneeboard of claim 1 comprising a writing structural portion and an anchor means connected to the writing structural portion, the writing structural portion comprising a flat, thin, yieldably deformable and resilient sheet of form stable plastic material, the writing structural portion further having an electroluminescent electrically powered in and flexible surface over which is affixed a transluscent write-on and erasable surface whereupon writing may be effected with a writing instrument, such as a common pencil, and may be read in otherwise total darkness due to the resulting contrast of the writing itself against the glowing subsurface.

5. An aviator's writing kneeboard of claim 1 comprising a writing structural portion and an anchor means connected to the writing structural portion, the writing structural portion comprising a flat, thin, yieldably deformable and resilient sheet of form stable plastic material, the writing structural portion further having affixed to it at an appropriate place or places, pieces of Velcro fastener material the purpose of which is to receive and hold an object, such as a pencil or small flashlight, to which the opposite type of Velcro fastener material is attached.

6. The aviator's kneeboard of claim 1 further comprising a flexible wire clip which supports a small flashlight from an elastic tensioned thigh mounted strap, by the interweaving design of the clip's wire in the tensioned strap.

7. As illuminated erasable writing kneeboard of claim 1, generally in the form of an aviator's kneeboard writing desk comprising a writing structural portion and an anchor means connected to the writing structural portion, the writing structural portion comprising a flat, thin, yieldably deformable and resilient sheet of form stable plastic material, the writing structural portion further being characterized by a surface illuminated by electroluminescently lighting the uppermost layer of said surface being of a permanent or semipermanent write-on erasable material the transluscence of which allow adequate transmission of light from the illuminating underlayer that characters written upon said uppermost layer are readable in otherwise total darkness due to the resulting contrast of the writing itself against the glowing subsurface.

* * * * *